United States Patent [19]

Schaupert

[11] Patent Number: 4,770,785
[45] Date of Patent: Sep. 13, 1988

[54] METHOD FOR SEPARATING GASEOUS AND VAPOROUS OR LIQUID MIXTURES BY DIFFUSION THROUGH MEMBRANES

[75] Inventor: Kurt Schaupert, Langen, Fed. Rep. of Germany

[73] Assignee: Gesellschaft fur Schwerionenforschung mbH, Darmstadt, Fed. Rep. of Germany

[21] Appl. No.: 721,934

[22] Filed: Apr. 9, 1985

[30] Foreign Application Priority Data

Dec. 12, 1984 [DE] Fed. Rep. of Germany ....... 3445291

[51] Int. Cl.$^4$ .............................................. B01D 13/00
[52] U.S. Cl. .................... 210/640; 210/651; 210/500.36
[58] Field of Search ............................ 264/22, 23, 24; 210/640, 500.2, 651, 500.36; 55/16, 158

[56] References Cited

U.S. PATENT DOCUMENTS

| 2,984,623 | 5/1961 | Lee ........................................ 210/640 |
| 3,950,247 | 4/1976 | Chiang et al. ..................... 210/640 X |
| 4,115,303 | 9/1978 | Marchand et al. ......... 210/500.36 X |

FOREIGN PATENT DOCUMENTS 2708641  8/1978  Fed. Rep. of Germany .

OTHER PUBLICATIONS

R. L. Fleischer et al., "Particle Track Etching", Science, vol. 178, pp. 255-263 (1972).
VDI-Z, 119, Nr. 15/16, p. 806 (1977).

*Primary Examiner*—Frank Spear
*Attorney, Agent, or Firm*—Spencer & Frank

[57] ABSTRACT

A process for separating mixtures of gases, vapors or liquids by diffusion through membranes. The object, the improvement of the degree of enrichment and of the separation characteristics, is accomplished by irradiating membranes with heavy ions perpendicularly or at an angle to their surfaces to produce latent nuclear traces. Without etching away the nuclear traces, the membranes are charged from one side with the mixture, a pressure differential is set-up, and the substances from the mixture are removed downstream from the other side, independently of the concentration difference, separating the components according to their rates of diffusion. The process has the further advantage that the components of the mixture to be separated are neither thermally stressed nor chemically changed. The process is suitable for the separation of a multitude of atomic and molecular mixtures.

20 Claims, 1 Drawing Sheet

METHOD FOR SEPARATING GASEOUS AND VAPOROUS OR LIQUID MIXTURES BY DIFFUSION THROUGH MEMBRANES

BACKGROUND OF THE INVENTION

1. Field of the Invention

The present invention relates a method for separating mixtures of gases, vapors or liquids by diffusion through membranes. This method is intended to separate atoms and molecules of various types from one another.

2. Description of the Background

In the past, molecular separations of this type have been effected by distillation, ultracentrifugation, precipitation, separation in chromatographic columns or diffusion through membranes. These known methods are relatively expensive due to high energy requirements, and some are not very specific, i.e., the separation process must be repeated in many successive stages, as very little enrichment is realized in each stage. Moreover, in processes such as distillation or precipitation, chemical changes occur in the substances to be separated.

Very few materials are available for separation by diffusion through membranes. In addition, a drawback of all known membrane separation processes is the great variation of pore sizes within the membranes.

The membranes and nuclear trace filters which are produced by subjecting a matrix to high energy radiation to form nuclear traces, and then subjecting the matrix to an etching process are known. The nuclear traces are etched to become holes whose diameters begin at about 5 nm (50 Å). These nuclear trace filters are used for ultrafine filtering of particles; it is, of course, not possible to use them to separate mixtures of atoms or molecules that all have molecular diameters significantly below the above-stated range.

SUMMARY OF THE INVENTION

The present invention improves the separating characteristics and qualities of membrane separation processes for mixtures of atoms and molecules and, primarily, to obtain a high degree of enrichment of the components to be separated.

In one aspect, the present invention comprises a process for separating mixtures of gases, vapors or liquids by diffusion through a membrane, wherein the membrane is a thin sheet of material that has been irradiated with heavy ions to produce latent nuclear traces. According to this process, mixtures to be separated are applied to one side of the irradiated membrane and the separated components are extracted downstream from the opposite side of the membrane. The membrane, or thin sheet, used in this method of separation is characterized by having latent nuclear traces or structural defects, formed by irradiation with heavy ions, that appear as sites of localized reductions in material density.

The present invention is based on the surprising discovery that various types of atoms and molecules may have different diffusion rates through the same latent and unetched nuclear traces produced by heavy ion irradiation of a matrix of dielectric solid bodies. The present invention, therefore, proposes to exploit, for the separation of the components in a mixture of substances, the different diffusion characteristics with respect to the nuclear traces or structural defects, as compared with the same material which has not been affected by irradiation.

Since the ions used to produce the structural defects in the matrix vary very slightly with respect to their energy and mass, the resulting nuclear traces or channellike material defects have practically identical separation characteristics. By appropriately selecting the type of ion and the irradiation energy, the radial magnitude (area) and maximum density reduction in the nanometer and subnanometer range can be accurately controlled and adapted to the separation task at hand. Thus, according to the present invention, the material properties on which the separation characteristics depend are considerably improved in an advantageous manner, with reduced variation.

A further advantage of the present procedure is that the mixture to be separated is neither thermally stressed nor chemically changed. Practically all formable dielectrics can be used as membranes for the novel process.

DETAILED DESCRIPTION OF THE EMBODIMENTS

Figure 1:
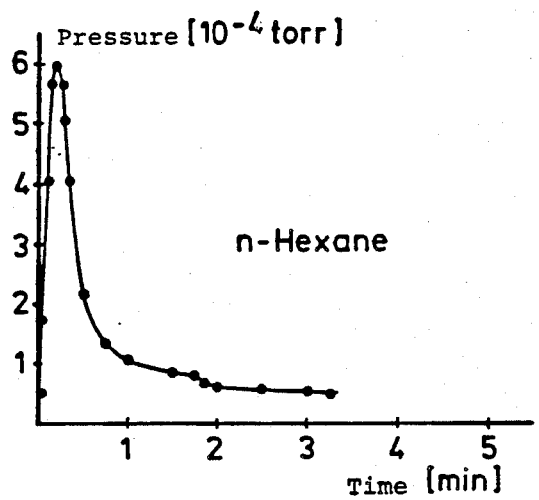
FIGS. 1 through 5 illustrate experimentally determined pressure curves for various substances downstream from a membrane that has been provided with nuclear traces in accordance with this invention and subjected to a pressure differential.

As set forth above, the novel method of the invention is based on the different diffusion rates of various atoms or molecules through unetched, latent nuclear traces, insofar as diffusion can take place at all in view of the size of the molecules. As an illustration of the invention, with a maximum diameter of an unetched nuclear trace of 10 nm, molecules having a diameter to least 2.5 nm, i.e. 25 Å, will still diffuse sufficiently.

Latent nuclear traces are structural defects produced in dielectric solids when heavy, high energy, fast ions pass through such solids. The density reductions, compared with the unaffected basic material, are as high as 10%, with the radius of the density reduction reaching a maximum of 5 nm. The magnitude of these values depends on the basic material irradiated, the type of ions used for irradiation, and on the irradiation energy. The radius of the traces in polyethylene terephtalate (R-HOSTAPHAN) ranges between 2.5 nm for tracks of Argon ions and 5.5 nm for tracks of uranium ions.

See the following examples,

The foils were irradiated using an accelerator of the type UNICAC in West-Germany.

The accelerator supplies ions of masses between argon and uranium with energies up to 18 MeV/u, thus making it possible to penetrate foil thickness in excess of 200 microns.

The foils were irradiated under vacuum. To accomplish this, the foils were mounted into sample holders which were slided through a vacuum seal into the irradiation chamber by means of an automatic sample changer. The sample changer controls the irradiation dose by measuring the ion current caught on isolated slits besides the sample position. The angle between the surface plane of the sample and the ion beam can be chosen between five degrees and perpendicular in steps of 0.1 degrees. A specific type of apparatus which can be used for separating substances using a membrane according to the invention is described in the following:

EXAMPLES

The pressure curves shown in FIGS. 1 through 5 were produced by membranes made from polyethylene terephthalate (R Hostaphan) sheets 19 microns in thickness, that were irradiated with uranium, xenon or argon ions at a density between $4.10^{10}$ and $10^{11}$ ions/cm² and an energy of 8.65 MeV/nucleon. The sheets were not etched after irradiation.

To determine the illustrated pressure curves, the sheets were glued to a standard flange so that an experimental area of about 1.5 cm² remained available in the center of the sheet.

The flange was connected via a valve to a chamber in which the gas pressure was measured as a function of unit time. The chamber was evacuated by means of a turbomolecular pump with forepump, and pumping continued during the taking of measurements. As a reference, non-irradiated sheets of the same material were tested under the same conditions and no diffusion effect was observed. Consequently, non-irradiated membrane sheets are impermeable for the substances employed in the experiment, i. e. methanol, ethanol, n-hexane and cyclohexane. The irradiated sheets, were able to withstand a pressure differential of 1 bar applied to accelerate throughput.

Figure 2:
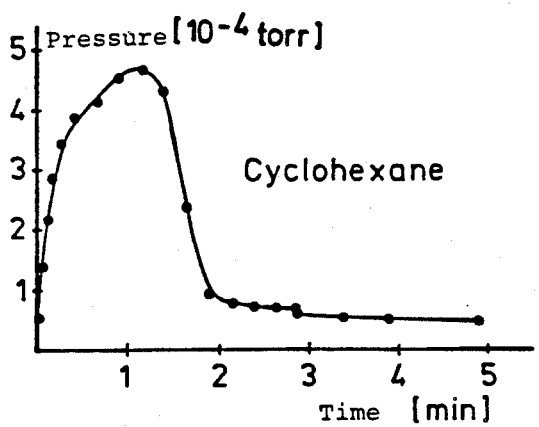

FIGS. 1 and 2 show pressure curves for n-hexane and cyclohexane, respectively, downstream from the thin sheets, or membranes, that have been irradiated with uranium ions at the energy and density levels set forth above.

The different diffusion rates can be seen at once, since for n-hexane 90% of the maximum pressure was reached within 9 seconds while the maximum was not reached until 42 seconds for cyclohexane. In these tests the liquids were dripped onto the sheet, but they can be charged in the gas phase as well.

Figure 3:
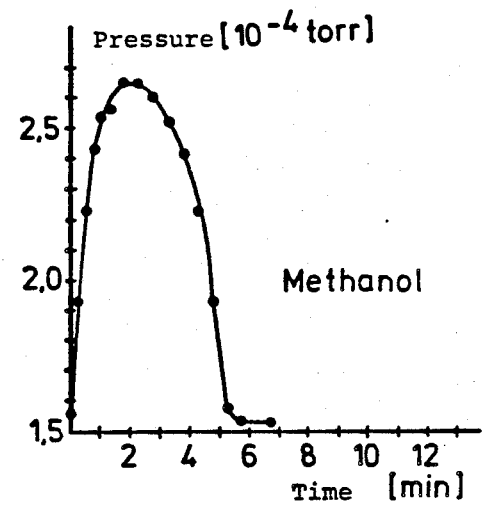
Figure 4:
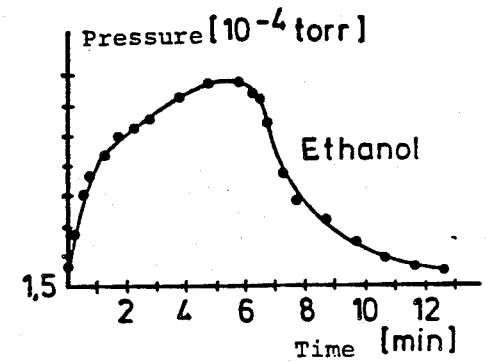
Figure 5:
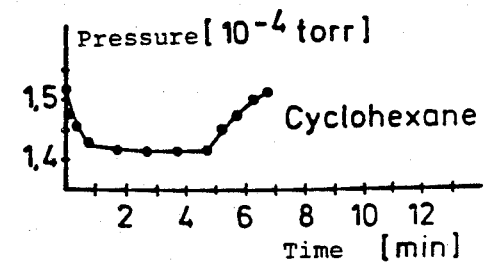

FIGS. 3, 4 and 5 show pressure curves for methanol, ethanol and cyclohexane downstream from a membrane which has been irradiated with xenon ions at the above-described energy and density levels.

90% of the maximum pressure was reached after one minute for methanol, after 3.5 minutes for ethanol.

The diffusion of cyclohexane through the membrane caused a drop in pressure instead of a rise in pressure, as in the other cases. This pressure drop disappeared when the liquid had completely diffused through the membrane. This phenomenon is explained by the charged liquid impeding the stream of air normally passing through the membrane, while not enough liquid passed through per unit time to produce sufficient gas by evaporation to make up for the loss of air flow.

Further measurements with sheets of the above-described type, which were irradiated with argon ions as described above, indicated a reduction of pressure corresponding to a slower diffusion of the molecules or atoms, respectively, for methanol and for ethanol.

According to this invention, it is possible to separately extract individual components from a mixture downstream from the membrane, at different times, and to have them separately available in highly enriched fractions. The embodiments shown in FIGS. 1 and 2 were drawn from an n-hexane/cyclohexane mixture, and the embodiments shown in FIGS. 3 and 4 were drawn from a methanol/ethanol mixture. It is apparent that after a certain period of time a concentration difference develops downstream from the membrane as compared with the concentration above the membrane.

Accordingly, mixtures of substances may be divided into fractions enriched for particular components by differences in their diffusion rates through the membranes of the invention and, in the case of large molecules, by their inability to diffuse through the membrane at all. The separately extracted or enriched individual components can be used in known cascade processes for further separation or enrichment. They can also be recirculated or conducted through further stages of the process of this invention until essentially pure fractions are obtained.

It is to be understood that the above description of the present invention is susceptible to various modifications, changes and adaptations within the scope of the claims which follow and the equivalents thereof.

What is claimed is:

1. A process for separating gases, vapors or liquids in a mixture by diffusion through a membrane having two opposing faces, comprising:
   providing an unetched membrane prepared by irradiating a dielectric solid membrane having two opposing faces with heavy ions to form latent and unetched nuclear traces,
   supplying a mixture to be separated by diffusion to a first face of said membrane,
   forming a pressure differential between the first face and a second face of said membrane, and
   inducing diffusion through said membrane of at least part of said mixture to enrich the mixture for those substances which diffuse less rapidly and form a fraction downstream from the second face of said membrane which is enriched in those substances which diffuse more rapidly.

2. The process of claim 1, wherein the pressure differential is formed between the first and second faces of said membrane by applying the mixture of substances to be separated under pressure.

3. The process of claim 1, wherein the pressure differential is formed between the first and second faces of said membrane by reducing the pressure on the second face side of said membrane.

4. The process of claim 1, wherein the part of said mixture which diffuses through the membrane is removed downstream from the second face in a multiplicity of fractions over time.

5. The process of claim 4, wherein certain of the multiplicity of fractions are recycled.

6. The process of claim 1 repeated in a multiplicity of successive stages using a multiplity of membranes.

7. The process of claim 1 wherein the heavy ions are selected from the group consisting of uranium, xenon, and argon.

8. The process of claim 1 wherein the membrane is irradiated with uranium, xenon or argon ions at a density between $4 \times 10^{10}$ and $10^{11}$ ions/cm².

9. The process of claim 1 wherein the membrane is a polyethylene terephthalate membrane having a thickness up to about 19 microns.

10. An unetched diffusion membrane for separating mixtures of gases, vapors or liquids, comprising a membrane prepared by irradiating a dielectric solid with heavy ions to form a multiplicity of latent and unetched nuclear traces located therein, said nuclear traces comprising sites of reduced density in said membrane.

11. The diffusion membrane of claim 10, wherein essentially all nuclear traces are at the same angle to at least one surface of said membrane.

12. The diffusion membrane of claim 11, wherein essentially all nuclear traces are perpendicular to at least one surface of said membrane.

13. The diffusion membrane of claim 10 wherein the nuclear traces comprising sites of reduced density in the membrane are formed by irradiation with heavy ions selected from the group consisting of uranium, xenon and argon ions.

14. The membrane of claim 13, wherein the heavy ions are irradiated at a density between about $4 \times 10^{10}$ and $10^{11}$ ions/cm$^2$.

15. The membrane of claim 10 wherein the membrane is a polyethylene terephthalate membrane of a thickness up to about 19 microns.

16. In an apparatus for separating mixtures of gas, vapors or liquids by diffusion, the improvement comprising:
an unetched membrane prepared by irradiating a dielectric solid with heavy ions to form a multiplicity of unetched latent nuclear traces located therein, said nuclear traces comprising sites of reduced density in said membrane.

17. The apparatus of claim 16 wherein the sites of reduced density in the membrane are formed by irradiation with heavy ions selected from the group consisting of uranium, xenon and argon ions.

18. The apparatus of claim 16 wherein the heavy ions are irradiated at a density between about $4.10^{10}$ and $10^{11}$ ions/cm$^2$.

19. The apparatus of claim 16 wherein the membrane is a polyethylene terephthalate membrane having a thickness up to about 19 microns.

20. In a diffusion membrane for separating mixtures of gases, vapors or liquids, the improvement wherein
an unetched membrane is prepared by irradiating a dielectric solid with heavy ions to form a multiplicity of latent and unetched nuclear traces located therein, said nuclear traces comprising sites of reduced density in said membrane.

* * * * *